Feb. 1, 1938.  D. ROBERTS ET AL  2,106,761
AIRPLANE
Filed Jan. 15, 1934  3 Sheets-Sheet 1
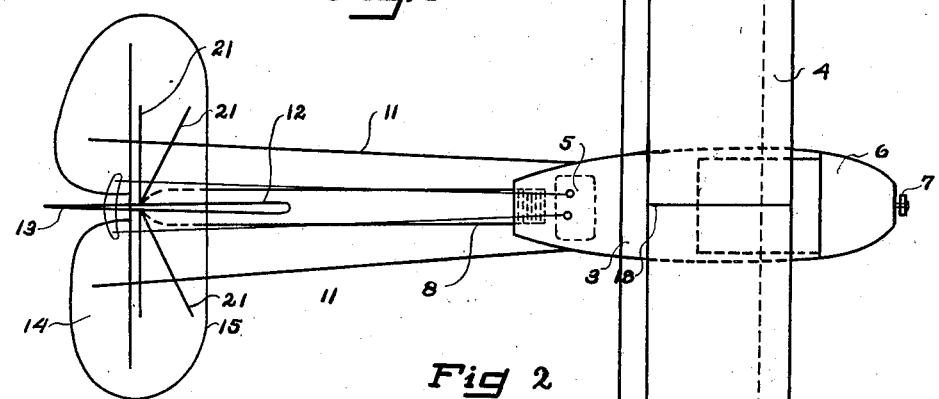
Fig. 1
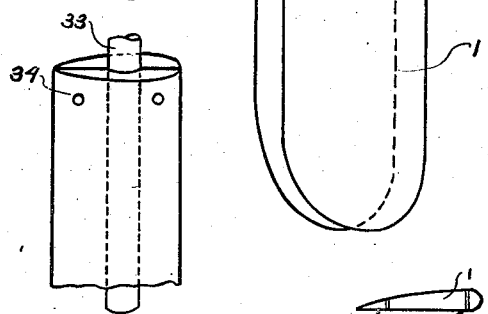
Fig. 2
Fig. 3
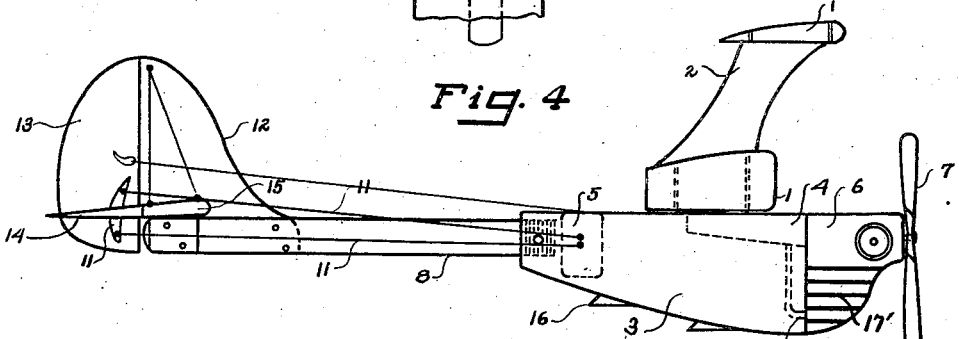
Fig. 4
INVENTORS
Dudley Roberts
Frederick William Peel
BY
Samuel Ostrolenk
ATTORNEY.

Feb. 1, 1938. D. ROBERTS ET AL 2,106,761
AIRPLANE
Filed Jan. 15, 1934 3 Sheets-Sheet 2
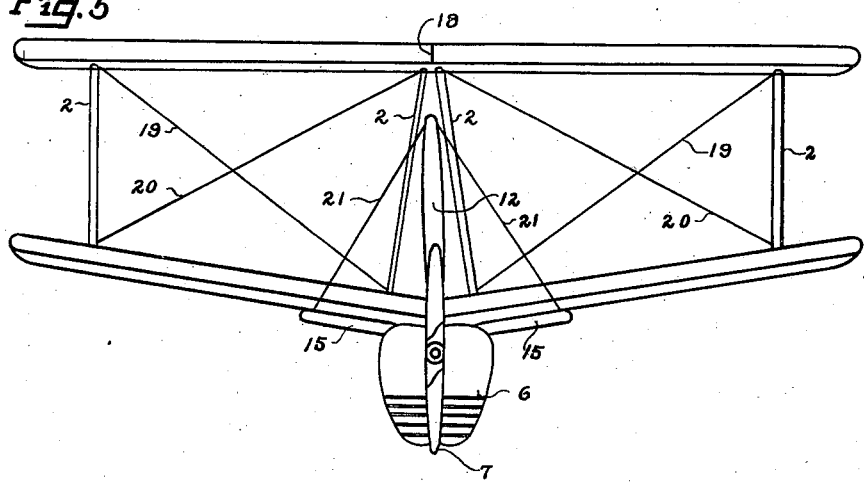
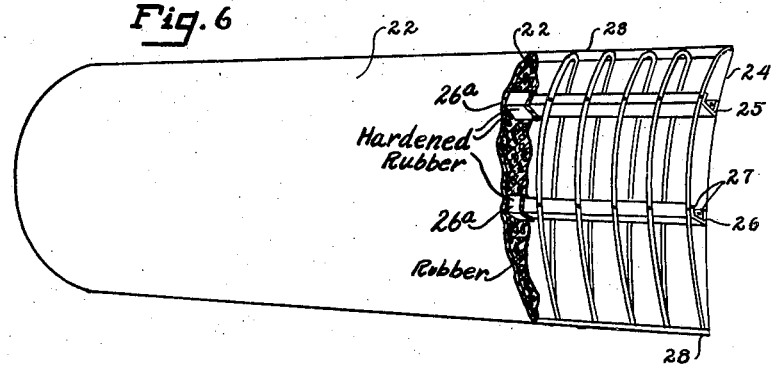
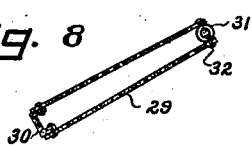
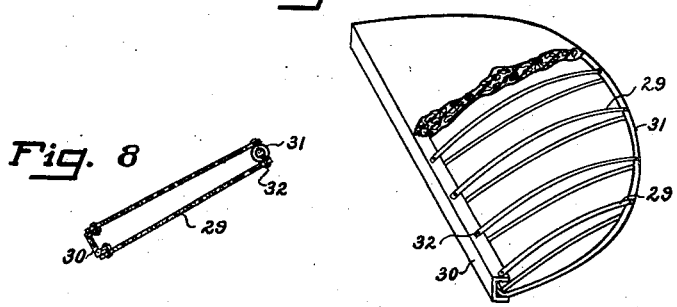
INVENTORS
Dudley Roberts
BY Frederick William Peel
ATTORNEY.

Feb. 1, 1938.                D. ROBERTS ET AL                2,106,761
                                 AIRPLANE
                          Filed Jan. 15, 1934         3 Sheets-Sheet 3

INVENTORS
Dudley Roberts
Frederick William Peel
BY
*Samuel Ostrolenk*
ATTORNEY.

Patented Feb. 1, 1938

2,106,761

UNITED STATES PATENT OFFICE 2,106,761

AIRPLANE

Dudley Roberts, New York, and Frederick William Peel, Yonkers, N. Y., assignors to Rubatex Products, Inc., Wilmington, Del., a corporation of Delaware Application January 15, 1934, Serial No. 706,772

3 Claims. (Cl. 244—133)

Our invention relates to a novel flying bomb and the manufacture thereof, and more particularly relates to novel construction of wings, propellers, wing assembly, rudder and the like parts of a flying bomb.

As is well known, the parts of an airplane must be built to provide maximum tensile and tortional strength at a minimum of weight. This is especially true of a pilotless automatic flying bomb plane intended to be remotely controlled in operation.

We have discovered that such a plane can be built cheaply with a very light but strong and durable material such as inflated rubber.

This rubber, the novel process of manufacture of which will be described below, and which contains an inert gas under high pressure, is made with the following constituents:

| | Percent |
|---|---|
| Washed first grade crepe or smoked rubber | 40–75 |
| Sulphur | 6–30 |
| Light calcined magnesia | 3– 5 |
| Ground gilsonite | 12 |
| Lower melting bituminous substances | 12 |

In the manufacture of this product, the crepe or smoked rubber is first masticated for a period of time depending on the poundage of rubber desired. To this is added an asphalt product such as bitumen, uniformly distributed over the rubber. In order to fully impregnate the bitumen in the rubber, the mixture is taken to a dark room for a period of twenty-four hours rest, at the end of which time it is placed on a warm mill and heated to a temperature not to exceed 100° F. to plasticize the product.

With the product in a plastic state, the sulphur, calcined magnesia, and gilsonite, in proportion as stated above, are then added and the resultant mixture held inactive for a second rest period of twenty-four hours to permit thorough impregnation. The resulting dough is then taken and manufactured into various articles such as slabs, boards, etc. by means of a warming up mill or forcing machine and then cut into desired sizes.

These are then well chalked with French chalk and placed in a container for gassing. The rubber containers are placed in an air-tight warm gassing chamber or autoclave and the air pumped out from this chamber until a substantial vacuum is produced. All the oxygen in the rubber is thus withdrawn, preventing subsequent deterioration by the action of oxygen on the rubber. This step is exceedingly important for a successful production of inflated rubber, as heretofore the failure to remove the oxygen has resulted in an early deterioration of the rubber.

Carbon dioxide, helium, nitrogen, or any non-combustible gas is then injected at a pressure which varies from amount of 2250 pounds per square inch and up.

With the rubber still in a soft state, the gas is now injected at a high pressure and at the same time a partial vulcanization is effected to retain the injected gas. As will be described in the following, this is carried out in two steps, a partial expansion and vulcanization, followed by a complete expansion and vulcanization. This is accomplished as follows:

This pressure is increased when heat is applied by the admission of steam through a steam jacket surrounding the gassing chamber for the purpose of partially vulcanizing the soft rubber containing the injected gas. This steam jacket, which is a spiral perforated tube, encircles the inner cylinder or gassing chamber to insure uniform distribution of heat. The steam pressure applied in the heating jackets may vary from four to sixteen pounds, and the heat is applied for a period of two hundred to six hundred minutes, depending on the physical conditions of the rubber product desired, such as the thickness of the material, weight, etc. Only partial vulcanization of the rubber has been accomplished up to this point.

The apparatus is now cooled either by permitting it to normally cool down, or by artificial means to cause more rapid cooling, the latter being preferred to save time.

At this point the gas chamber contains a considerable excess of the gas admitted for inflating the rubber, and this excess is drawn off slowly and stored in ether vats through a chalk seperator for subsequent use. When the gas has all been withdrawn, the container with the rubber is removed from the gassing chamber.

At this time, as stated above, the rubber has been only partially vulcanized and has not yet been fully expanded to its maximum possibilities. Complete vulcanization and final expansion of this rubber material must be accomplished within twenty-four hours, in order to prevent loss of gas in the partly vulcanized rubber.

For the final vulcanization of the rubber, it is placed in a mold whose inner dimensions and shape are exactly the same as the external dimensions and shape of the desired article. This is then subjected to a further high temperature of heat, preferably steam, at from sixty to one hundred twenty pounds pressure, the time of application varying, in accordance with the size of the molded material, anywhere from twenty-five minutes to twenty-three hours.

The end product of this process is a rubber which is spongy and inflated with a gas at high pressure and temperature until it expands and assumes a cellular structure, the cells of which are filled with the injected gas and a suitable preservative. A seal composition has been added which imprisons the occluded gases in the pores or cells or interstices after the pressure and heat have been removed.

The resulting product we have found has considerable strength and durability and yet is extremely light, its weight varying from two and one half to five pounds per cubic foot, depending upon the pressure and temperature treatment given as cited above and upon the cellular seal provided in a manner which is now well-known in the art.

Accordingly, an object of our invention is to provide a novel construction and manufacture of a flying bomb.

A further object of our invention is to provide a flying bomb whose wings, propeller, tail surfaces and struts are constructed of sponge or froth rubber suitably treated at temperatures and pressures to produce a cellular structure impregnated with an occluded gas.

Still a further object of our invention is to provide a novel construction of wing made from sponge rubber.

Another object is to provide novel construction of propeller made of sponge rubber.

Still a further object is to provide a novel construction of wing struts.

A further object is to provide a novel construction of tail surfaces made of froth rubber.

There are other objects of our invention which together with the foregoing will appear in the detailed description which is to follow in connection with the drawings, in which:

Figure 1 is a top plan view of our flying bomb plane;

Figure 2 is a wing strut assembly view;

Figure 3 is a cross section of the wing strut assembly;

Figure 4 is a side view of the entire plane front shown in Figure 1;

Figure 5 is a front view of the plane shown in Figure 1;

Figure 6 is a perspective view with a part removed of my novel wing structure;

Figure 7 is a detail in perspective of the novel construction of the rudder;

Figure 8 is a sectional view of Figure 7;

Figure 9:
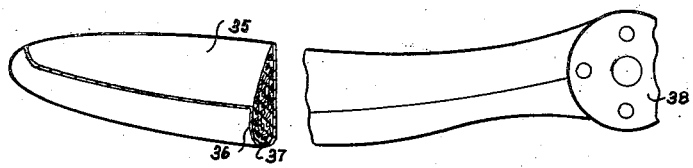
Figure 9 is a side view of a propeller embodying our invention.

Referring now more specifically to Figures 1 to 8, we have disclosed a novel construction of flying bomb adapted to be remotely controlled, several members of which are made substantially or entirely of our novel rubber, described above.

The wings 1, the details of which will be described hereinafter, are suitably secured to each other by the wing strut assembly 2, fastened to fittings attached to the spars of the wing, the details of which will be described hereinafter in connection with Figure 6.

The fuselage of the airplane comprises mainly a large explosive chamber 3 made of some strong cheap metal such as malleable iron to resist a predetermined explosive pressure and containing therein an explosive mixture adapted to set off by remote control or by impact. Adjoining the chamber 3 at its upper portion and to the right, we provide a gasolene compartment 4 containing the fuel for driving the motor, diagrammatically illustrated at 6. The motor drives the propeller 7, the details of which will be described hereinafter. The tank 4 is connected to the motor 6 by the gas line 17. In order to provide for cooling the engine, suitable cooling ribs 17' are provided. It will be understood, however, that these are detailed features here diagrammatically illustrated, as they are well-known in the art and do not form part of the present invention.

At the rear end of the chamber 3, an opening is provided, internally threaded for receiving a metal tube 8 having screw threads adapted to engage the internal threads of the opening. At the opposite end of the tube 8, a rudder 13, having the usual fin construction 12, elevator 14 and stabilizer 15 are suitably supported.

For controlling the operation of these parts, a radio control unit 5 is mounted near the rear end of chamber 3 and has, extending therefrom, control wires 11 extending to the horn 11' through which it controls the operation of the rudder and elevator. Suitable tail surface wires 21 connect the fin 12 with the stabilizers 13 to operate the latter in a manner well-known in the art. Interconnecting the wings 1 are the wires 20, also of well-known construction.

Having described the general assembly of our flying plane, we shall now describe the detailed structure of the parts.

Referring to Figure 6, we have disclosed a wing 1, comprising the nose former 23 and the trailing edge former 28, to which are suitably riveted a series of ribs 24. Ribs 24, the peripheries of which are cambered as shown, to provide the desired wing shape, are suitably secured as by rivets 27 to the channel-shaped front and rear spars 25 and 26 respectively, extending transversely the length of the wing. The entire wing structure assembly, described above, is suitably bolted to the fuselage through conventional aircraft fittings attached to the spars.

Heretofore, as explained above, these wings, after being suitably constructed with the spars and ribs, have been provided with a canvas covering which has previously been treated to give it strength and then secured to the framework. The treatment, while essential for increasing the fabric strength, adds considerable weight to this canvas and, to an extent destroys its effectiveness as a light weight medium for transferring the forces applied thereto to the ribs and spars.

In accordance with our invention, we contemplate replacing the canvas covering by our novel rubber, described above, molded into a predetermined shape, such as cambered about the ribs and spars.

To this end, the framework, including these ribs and spars, is placed in a mold into which is admitted the prepared rubber at the stage when it is to enter a mold, as described above.

On cooling in the mold, which, it will be understood, is shaped to produce the desired wing shape, a wing is produced, made of our preferred expanded rubber and having imbedded therein for reinforcing purposes the spars and ribs. The spars and ribs being of metal, are good heat conductors. Accordingly, when heat is applied in the mold, it is conducted along the metal, thus producing a hardened layer along the interior of the rubber as indicated at 26ª, Fig. 6, adding to its reinforcement.

Moreover, because of the use of this rubber, it will not be necessary to use as many ribs as was necessary with a cloth cover. Accordingly, a fewer number of ribs more widely spaced will be used, thus materially reducing the weight of the wing.

In accordance with our invention, the ribs and spars might be replaced by the reinforcing members suitably interspersed and imbedded in the expanded rubber for giving it necessary strength and providing for the attachment of fittings and the like.

It will be obvious that although we have described the wing section in connection with a flying bomb, it may be also used on any other type of plane. Furthermore, although one form of wing structure is shown, it will be obvious to those skilled in the art that the principle of our invention can readily be applied to other structures. Thus, although the frame-like ribs are shown, other well-known constructions, such as flat ribs provided with screw openings may be used for receiving the spars. Similarly the specific shape of the wing may be varied in different needs. It will be understood that irrespective of these details, our invention resides in the construction of a wing with expanded rubber such as described in the present application.

In order to streamline the braces interconnecting the wings, we have arranged to mount these members 33, Figures 2 and 3, in a bed of rubber 34, preferably our expanded rubber, and shaped as shown for streamline purposes. This member may be constructed in a mold with the brace rods 33 in place, as shown in a manner described in detail in connection with the wing section.

Thus there is provided a streamline mounting for these protruding members, decreasing the drag correspondingly. The added weight of the mounting is more than compensated for by the decrease in drag resulting from streamlining these braces.

In Figures 7 and 8 we have shown the details of the rudder construction. This rudder comprises a spar 30 and a trailing edge former 31 to which are suitably secured, as by rivets, the ribs 29 forming a framework structure, which when placed in the mold in the manner described in connection with the wing section, is imbedded in the sponge rubber, as shown. A similar construction is provided for the fin 12, stabilizer 15 and elevator 14.

Figure 10:
Figure 10 is a side view of the modified form of propeller embodying our invention.

Referring to Figures 9 and 10, we have disclosed a propeller 35 in which our novel expanded rubber 37 is molded into any desirable shape for a propeller. A shell 36, made of any light and durable metal such as duraluminum, protects the leading edge of the propeller and terminates in a hub 38 of any well known construction.

In Figure 10 we have shown a modified form of propeller 40 in which the expanded rubber 42, molded in the manner described above is provided with a metallic member 41 over its leading edge.

Figure 11:
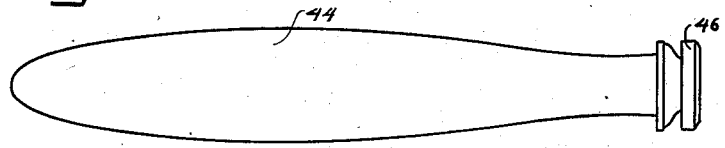
Figure 11 is a side view of a further modified form of propeller.
Figure 12:
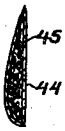
Figure 12 is a cross section of Figure 11.

In Figures 11 and 12, we have disclosed a propeller 44 made of any light thin sheet metal, such as duraluminum, terminating in a hub 46. This member is first placed in a mold and our novel expanded rubber is admitted through the opening in the hub. The final molding step then occurs. The metal container is then flattened against the mold and the rubber vulcanized until it adheres to the metal container.

Heretofore, propellers have been constructed of solid material such as metal, wood, and the like. Such metal or wood, however, is comparatively heavy adding materially to the weight and increasing the losses correspondingly.

In accordance with our invention the propeller is provided with substantially the same strength as the other constructions, but of much lighter material and accordingly correspondingly increases the over-all airplane efficiency. Moreover, this material is considerably cheaper than the solid metal block.

Although for purposes of illustration we have illustrated a specific construction of wings, struts, propellers, etc., it will be obvious to those skilled in the art that other constructions of parts can be used just as well in carrying out our invention.

Basically we have disclosed a practical construction of airplane which can be used as a remotely controlled bomber. It can be made much lighter than has heretofore been possible. The parts such as the wings, propellers, struts and tail can be molded and therefore can be cheaply built—and yet the durability and reliability is fully sufficient for the purpose of a bomb plane.

Although we have described the several members as applied to a bomber, it will be obvious that these parts may also be used with other types of airplanes.

Accordingly, we do not wish to be limited by our specific construction, but only as set forth in the appended claims.

We claim:

1. In an airplane, an aerofoil made of a hard rigid integral continuous expanded rubber made of a minute cellular structure, each of the cells being individually sealed from the other cells, each containing a gas admitted at the relatively high pressure of 3000 pounds per square inch; and reinforcing members imbedded in said rubber for supporting fittings, said rubber containing a tough crust of rubber along the reinforcing members.

2. In an airplane, an aerofoil made of a hard rigid integral continuous expanded rubber of a minute cellular structure, each of the cells being individually sealed from the other cells and containing a gas admitted at a relatively high pressure and reinforcing members imbedded in said rubber for supporting fittings said rubber containing a tough crust of substantially noncellular rubber along the reinforcing members.

3. In an airplane, an aerofoil comprising hard and rigid minute closed cell gas expanded rubber, each of the cells being individually sealed from the other cells, said closed cell gas expanded rubber having a weight of substantially about two and one-half to five pounds per cubic foot, and reinforcing members embedded in said rubber for supporting fittings, said rubber having a tough crust of rubber along the reinforcing members.

DUDLEY ROBERTS.
FREDERICK WILLIAM PEEL.